(12) United States Patent
Gentry et al.

(10) Patent No.: US 10,315,158 B2
(45) Date of Patent: *Jun. 11, 2019

(54) CENTRIFUGAL AIR SEPARATORS

(71) Applicant: The Boeing Company, Chicago, IL (US)

(72) Inventors: Gregory James Gentry, Seabrook, TX (US); Chang Hyun Son, League City, TX (US); Robert Warren Clark, Jr., Friendswood, TX (US)

(73) Assignee: The Boeing Company, Chicago, IL (US)

( * ) Notice: Subject to any disclaimer, the term of this patent is extended or adjusted under 35 U.S.C. 154(b) by 263 days.

This patent is subject to a terminal disclaimer.

(21) Appl. No.: 15/445,808

(22) Filed: Feb. 28, 2017

(65) Prior Publication Data

US 2017/0165604 A1 Jun. 15, 2017

Related U.S. Application Data

(63) Continuation of application No. 14/671,761, filed on Mar. 27, 2015, now Pat. No. 9,610,525.

(51) Int. Cl.
*B01D 53/24* (2006.01)
*B01D 45/16* (2006.01)
(Continued)

(52) U.S. Cl.
CPC .............. *B01D 53/24* (2013.01); *B01D 45/00* (2013.01); *B01D 45/12* (2013.01); *B01D 45/16* (2013.01); *B01D 46/30* (2013.01); *B01D 53/02* (2013.01); *B01D 53/22* (2013.01); *B01D 2257/504* (2013.01); *B01D 2313/42* (2013.01);
(Continued)

(58) Field of Classification Search
CPC ........ B01D 53/24; B01D 53/22; B01D 53/02; B01D 45/00; B01D 46/30; B01D 45/12; B01D 45/16; B01D 2313/42; B01D 2257/504; Y02C 10/08; Y02C 10/10; F25B 9/04

See application file for complete search history.

(56) References Cited

U.S. PATENT DOCUMENTS

| | | | | |
|---|---|---|---|---|
| 1,306,003 A | * | 6/1919 | Good ..................... | B01D 45/16 237/68 |
| 1,387,748 A | * | 8/1921 | Wilson ............... | B01D 19/0057 96/158 |

(Continued)

*Primary Examiner* — Dung H Bui
(74) *Attorney, Agent, or Firm* — DASCENZO Intellectual Property Law, P.C.

(57) ABSTRACT

Centrifugal air separators, systems including the same, and methods of separating gas are disclosed. Centrifugal air separators include a separation section configured to separate an input air stream into a clean air stream emitted from an exit port of the separation section and a waste stream emitted from a waste port of the separation section. The separation section includes a coiled duct and is configured to transmit through a duct entrance port a duct input air stream that is at least a portion of the input air stream and to at least partially separate the duct input air stream according to a molecular weight of gaseous components of the duct input air stream into a duct clean air stream that is at least a portion of the clean air stream and a duct waste stream that is at least a portion of the waste stream.

20 Claims, 5 Drawing Sheets

(51) Int. Cl.
*B01D 45/12* (2006.01)
*B01D 45/00* (2006.01)
*B01D 46/30* (2006.01)
*B01D 53/02* (2006.01)
*B01D 53/22* (2006.01)
*F25B 9/04* (2006.01)

(52) U.S. Cl.
CPC ................ *F25B 9/04* (2013.01); *Y02C 10/08* (2013.01); *Y02C 10/10* (2013.01)

(56) References Cited

U.S. PATENT DOCUMENTS

| | | | | |
|---|---|---|---|---|
| 1,799,684 A * | 4/1931 | Gilbert | ...................... | F04F 5/08 417/185 |
| 1,958,577 A * | 5/1934 | Hirshfeld | ................... | B07B 7/08 55/355 |
| 2,015,076 A * | 9/1935 | Et Lavigne | ............ | B01D 45/12 55/461 |
| 2,049,578 A * | 8/1936 | Werts | ....................... | E21B 43/34 96/159 |
| 2,184,095 A * | 12/1939 | Daly | .......................... | F24F 6/12 122/32 |
| 2,281,065 A * | 4/1942 | Et Lavigne | .......... | B01D 5/0006 62/617 |
| 2,676,667 A * | 4/1954 | Dodge | ................... | F24F 3/1405 165/122 |
| 2,889,044 A * | 6/1959 | Cloos | ...................... | B03B 5/626 209/434 |
| 3,706,383 A * | 12/1972 | Palma | .................... | B01D 45/16 209/434 |
| 3,875,061 A | 4/1975 | Palma | | |
| 4,056,373 A | 11/1977 | Rubin | | |
| 4,133,762 A | 1/1979 | Visceglia et al. | | |
| 4,231,763 A * | 11/1980 | Baisden | ................. | B01D 45/16 422/177 |
| 4,723,972 A * | 2/1988 | Leach | .................... | B01D 53/24 55/345 |
| 5,963,611 A * | 10/1999 | Narabayashi | .......... | B01D 53/24 376/371 |
| 6,569,323 B1 * | 5/2003 | Pribytkov | .......... | B01D 17/0217 209/715 |
| 6,716,269 B1 | 4/2004 | Graff et al. | | |
| 6,981,995 B2 * | 1/2006 | Lombana | ............... | B01D 45/12 55/452 |
| 8,001,811 B2 * | 8/2011 | Hahm | ..................... | D06F 39/02 68/13 A |
| 2006/0191415 A1 * | 8/2006 | Johnson | ................ | B01D 45/16 96/108 |
| 2015/0151231 A1 * | 6/2015 | Loh | .......................... | B04C 5/06 95/271 |

* cited by examiner

CENTRIFUGAL AIR SEPARATORS

RELATED APPLICATION

This application is a continuation of U.S. patent application Ser. No. 14/671,761, which was filed on Mar. 27, 2015, and entitled "CENTRIFUGAL AIR SEPARATORS," the complete disclosure of which is incorporated by reference.

FIELD

The present disclosure relates to centrifugal air separators.

BACKGROUND

Purification of gases in air may be useful or vital in enclosed environments such as spacecraft, space habitats, submarines, underground mines, and terrestrial and non-terrestrial vehicles (e.g., aircraft, armored vehicles, and pressurized rovers). In particular, people produce carbon dioxide ($CO_2$) as a metabolic byproduct that can become noxious if accumulated within an enclosure. The average person exhales almost a kilogram (kg) of carbon dioxide per day. In environments containing higher levels of carbon dioxide, people may experience symptoms such as nausea, dizziness, and headaches. Hence, manned, enclosed environments need a mechanism to remove carbon dioxide produced within the environment. Additionally, animals and plants are sensitive to the level of carbon dioxide and would benefit from carbon dioxide control.

Two methods are commonly used to control the carbon dioxide level in manned spacecraft—adsorption and chemical reaction. Chemical reaction systems use chemicals (such as lithium hydroxide or potassium superoxide) that react with carbon dioxide in the air to form benign products. These systems are one-time use. Once all of the chemical is reacted, no more carbon dioxide may be removed from the air. Chemical reaction systems may use relatively little electrical power (e.g., to operate a blower to direct air through a bed of the carbon dioxide-reactive chemical) but do require a significant supply of replacement chemical. For example, a lithium hydroxide system requires about 1.5 kg of lithium hydroxide to remove the carbon dioxide produced by one person per day.

Adsorption systems are regenerative and thus do not have significant supply requirements. Adsorption systems selectively adsorb carbon dioxide under certain conditions and release carbon dioxide under other conditions. For example, the International Space Station uses beds of zeolite pellets that adsorb carbon dioxide from the air of the cabin and that release the carbon dioxide when heated under vacuum (e.g., exposed to space vacuum). Because zeolites commonly preferentially adsorb water vapor over carbon dioxide, zeolite-based systems typically include a regenerative desiccant (e.g., a bed of silica gel) to remove water from the air to be exposed to the zeolites. Adsorption systems may use significant electrical power to regenerate the adsorbent bed and/or the desiccant bed. Additionally, adsorption systems may be quite bulky and heavy. For example, the carbon dioxide removal systems on the International Space Station require about 1 kW (kilowatt) of power and the adsorbent beds weigh about 48 kg each.

SUMMARY

Centrifugal air separators, systems including the same, and methods of separating gas are disclosed. Centrifugal air separators include a drive section and a separation section. The drive section is configured to direct an input air stream from an atmosphere of an enclosure into an entrance port of the separation section and is configured to direct the input air stream through the separation section. The separation section is configured to separate the input air stream into a clean air stream emitted from an exit port of the separation section and a waste stream emitted from a waste port of the separation section.

The separation section includes at least one coiled duct that has a duct entrance port fluidically connected to the entrance port of the separation section, a duct exit port fluidically connected to the exit port of the separation section, and a duct waste port fluidically connected to the waste port of the separation section. Further, the coiled duct defines a channel between the duct entrance port and the duct exit port. The duct waste port is proximate the duct exit port and fluidically connected to the channel. The separation section is configured to transmit through the duct entrance port a duct input air stream that is at least a portion of the input air stream and is configured to at least partially separate the duct input air stream according to a molecular weight of gaseous components of the duct input air stream into a duct clean air stream that is at least a portion of the clean air stream and a duct waste stream that is at least a portion of the waste stream.

Systems may be life support systems to support mammals living in an enclosure. For example, systems may include a carbon dioxide sensor, a centrifugal air separator, and a controller. The centrifugal air separator includes a separation section with a coiled duct. The coiled duct has a duct entrance port fluidically connected to the entrance port of the separation section, a duct exit port fluidically connected to the exit port of the separation section, and a duct waste port fluidically connected to the waste port of the separation section. The separation section is configured to transmit through the duct entrance port a duct input air stream that is a portion of the input air stream. The coiled duct is configured to at least partially separate the duct input air stream according to a molecular weight of gaseous components of the duct input air stream into a duct clean air stream that is a portion of the clean air stream and a duct waste stream that is a portion of the waste stream. The carbon dioxide sensor is configured to sense a partial pressure of carbon dioxide in an atmosphere of the enclosure. The controller is programmed to maintain a level of carbon dioxide in the atmosphere of the enclosure at a partial pressure of less than a threshold value by controlling air flow through the centrifugal air separator based upon the level of carbon dioxide in the atmosphere of the enclosure.

Methods may include recirculating clean air in an atmosphere of an enclosure. For example, methods may include directing an input air stream from the atmosphere of the enclosure through a number of coiled ducts at a rate sufficient to stratify the input air stream within each coiled duct according to a molecular weight of gaseous components of the input air stream and to form a heavy fraction stream and a light fraction stream. The heavy fraction stream is relatively enriched in carbon dioxide as compared to the light fraction stream. Further, methods may include withdrawing the heavy fraction stream from the number of coiled ducts and returning the light fraction stream from the number of coiled ducts to the atmosphere of the enclosure. Methods also may include controlling a level of carbon dioxide in the atmosphere of the enclosure by selecting the number of coiled ducts.

DESCRIPTION

Figure 1:
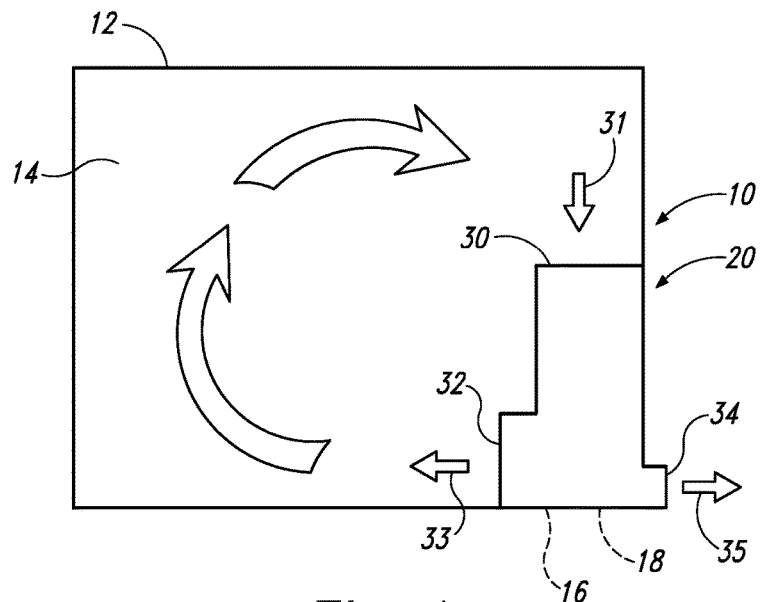
FIG. 1 is a schematic representation of a system that includes a centrifugal air separator.

FIGS. 1-7 illustrate centrifugal air separators, systems including the same, and methods of separating gas. In general, in the drawings, elements that are likely to be included in a given embodiment are illustrated in solid lines, while elements that are optional or alternatives are illustrated in dashed lines. However, elements that are illustrated in solid lines are not essential to all embodiments of the present disclosure, and an element shown in solid lines may be omitted from a particular embodiment without departing from the scope of the present disclosure. Elements that serve a similar, or at least substantially similar, purpose are labeled with numbers consistent among the figures. Like numbers in each of the figures, and the corresponding elements, may not be discussed in detail herein with reference to each of the figures. Similarly, all elements may not be labeled or shown in each of the figures, but reference numerals associated therewith may be used for consistency. Elements, components, and/or features that are discussed with reference to one or more of the figures may be included in and/or used with any of the figures without departing from the scope of the present disclosure.

FIG. 1 is a schematic representation of a system 10 that includes a centrifugal air separator 20. Systems 10 are configured to separate a gas stream flowing through the system 10 into a light fraction stream and a heavy fraction stream according to the molecular weight of the components of the gas stream. The system 10 may be, may be a portion of, or may include a gas separation system, a gas purification system, an air separation system, an air purification system, an environmental control system, an air recycling system, a carbon dioxide removal system, and/or a life support system. For example, system 10 may be a life support system to support mammals (e.g., humans), animals, and/or plants living in an enclosure 12.

System 10 may be included in, may be a component of, and/or may be coupled to an enclosure 12. Enclosures 12 define an enclosed space with an atmosphere 14. Enclosures 12 may be substantially sealed, completely sealed, or partially sealed such that gas (e.g., 'fresh air') from outside the enclosure 12 does not readily mix with the atmosphere 14 of the enclosure 12 and/or such that the atmosphere 14 does not substantially leak out of the enclosure 12. Examples of enclosures 12 include spacecraft, space habitats, space suits, submarines, submersibles, underground mines, terrestrial vehicles (e.g., aircraft, armored vehicles), non-terrestrial vehicles (e.g., pressurized rovers), and greenhouses. Additionally or alternatively, enclosure 12 may be an open enclosure such as an exhaust duct, flue, etc. that directs gas to the system 10 and/or centrifugal air separator 20. For example, systems 10 may be used for carbon dioxide scrubbing at refineries, power plants, cement plants, and/or chemical processing facilities.

The atmosphere 14 of the enclosure 12 typically is breathable and composed of similar gases as the Earth's atmosphere. Carbon dioxide and other gases may be confined within the enclosure 12 and/or produced within the enclosure 12. For example, people, which may be within the enclosure 12, generate about 1 kg of carbon dioxide per day per person. Additionally or alternatively, the atmosphere 14 may be a gas composition with higher molecular weight components and lower molecular weight components. The higher molecular weight components may include carbon dioxide and/or other higher molecular weight gases (e.g., trace contaminants such as ethanol, acetone, toluene, etc.). The lower molecular weight components may include beneficial and/or benign components (at least in the sense of breathability) such as oxygen, water vapor, nitrogen, and/or argon. Though atmosphere 14 is breathable and includes carbon dioxide in most examples disclosed, atmosphere 14 does not require carbon dioxide or breathable gases.

As schematically illustrated by the arced arrows in the enclosure 12 of FIG. 1, the atmosphere 14 may circulate within the enclosure 12 and/or be directed into the system 10 and/or the centrifugal air separator 20.

Centrifugal air separators 20 are configured to separate a gas stream flowing through the centrifugal air separator 20 into a light fraction stream and a heavy fraction stream according to the molecular weight of the components of the gas stream. Centrifugal air separators 20 include an entrance port 30 configured to accept the gas stream (the input air stream 31), an exit port 32 configured to emit the light fraction stream (the clean air stream 33), and a waste port 34 configured to emit the heavy fraction stream (the waste stream 35).

The naming of the centrifugal air separator 20, the input air stream 31, the clean air stream 33, the waste port 34, and the waste stream 35 is in accord with the use of the centrifugal air separator 20 in a life support system or similar system. These terms are used for consistency and clarity without implying a limitation on the use of the centrifugal air separator 20. Centrifugal air separators 20 are configured to separate gas and are not necessarily limited to separating air. Centrifugal air separators 20 also may be referred to as gas separators, gas purifiers, air separators, air purifiers (e.g., centrifugal air purifiers), air scrubbers (e.g., centrifugal air scrubbers), and/or carbon dioxide removal apparatuses (e.g., centrifugal carbon dioxide removal apparatuses). The input air stream 31 is a gas stream and is not necessarily a stream of air. The input air stream 31 also may be referred to as the input stream and/or the mixed gas stream. The clean air stream 33 is the light fraction of gas output from the centrifugal air separator 20 and is not necessarily air or clean. The clean air stream 33 also may be referred to as the light fraction stream, the lower molecular weight output stream, the purified air stream, the purified stream, and/or the primary output stream. The exit port 32, which is configured to emit the clean air stream 33, may be referred to as the light fraction port, the clean port, and/or the primary exit port. The waste stream 35 is the heavy fraction of gas output from the centrifugal air separator 20 and is not necessarily waste, impurities, contamination, undesired gas, or unused gas. The waste stream 35 also may be referred to as the heavy fraction stream, the higher molecular weight output stream, the bleed stream, and/or the secondary output stream. The waste port 34 is configured to emit the waste stream 35 and is not necessarily configured to emit waste, impurities, or contamination. The waste port 34 may be referred to as the heavy fraction port, the bleed port, and/or the secondary exit port. Without implying any particular use or limitation, ports and streams associated with other components are named according to their logical connection to entrance port 30, the input air stream 31, the exit port 32, the clean air stream 33, the waste port 34, and/or the waste stream 35.

Centrifugal air separators 20 may include a plurality of entrance ports 30, a plurality of exit ports 32, and/or a plurality of waste ports 34. Each port of the plurality of ports may have an independent gas stream and the total flow through all of the ports of a plurality of ports may be referred to as the total, or collective, gas stream (e.g., the collective input stream, the collective primary output stream, and the collective waste stream).

The input air stream 31 is a sample of the atmosphere 14 (or other gas source). The clean air stream 33 has less (by mass and/or concentration) higher molecular weight components than the input air stream 31. The waste stream 35 has more (by mass and/or concentration) higher molecular weight components than the input air stream 31. Thus, the waste stream 35 may be relatively enriched in higher molecular weight components as compared to the input air stream 31 and/or the clean air stream 33. Similarly, the clean air stream 33 may be relatively depleted in higher molecular weight components as compared to the input air stream 31 and/or the waste stream 35. The clean air stream 33 may have more (by mass and/or concentration) lower molecular weight components than the input air stream 31. The waste stream 35 may have less (by mass and/or concentration) lower molecular weight components than the input air stream 31. Thus, the waste stream 35 may be relatively depleted in lower molecular weight components as compared to the input air stream 31 and/or the clean air stream 33. Similarly, the clean air stream 33 may be relatively enriched in lower molecular weight components as compared to the input air stream 31 and/or the waste stream 35.

Higher molecular weight components may include gases with a molecular weight (M.W.) greater than or equal to a threshold such as a molecular weight of 36, 38, 40, 42, or 44. Such thresholds may differentiate most beneficial and benign gases in a breathable atmosphere (e.g., water vapor (M.W. 18), nitrogen (M.W. 28), oxygen (M.W. 32), and argon (M.W. 40)) from carbon dioxide (M.W. 44) and higher molecular weight (potentially contaminant) gases. As an example, for an input air stream 31 that includes oxygen, water vapor, nitrogen, and carbon dioxide, the higher molecular weight components may include carbon dioxide while the lower molecular weight components may include oxygen, water vapor, and nitrogen.

The waste stream 35 may include carbon dioxide and/or heavier components. Further, the waste stream 35 may consist primarily of carbon dioxide and/or heavier components. The clean air stream 33 may include components lighter than the primary components of the waste stream 35. For example, the clean air stream 33 may include components such as oxygen and/or water vapor, which are lighter than carbon dioxide. Because, the centrifugal air separator 20 is configured to separate the input air stream 31 according to the molecular weight of the components, carbon dioxide may be separated from oxygen and water vapor without first desiccating the input air stream 31.

Systems 10 and/or centrifugal air separators 20 may be configured to discharge a waste stream 35 consisting primarily of higher molecular weight components and little to none of the lower molecular weight components of the input air stream 31. For an isolated enclosed system, such as a spacecraft, conservation of the atmosphere 14 is an important consideration. Hence, systems 10 and/or centrifugal air separators 20 may be configured to remove carbon dioxide (discharged in the waste stream 35) while removing little to none of the beneficial and/or benign components of the atmosphere 14. The beneficial and/or benign components would be discharged back into the atmosphere 14 as the clean air stream 33. For example, the waste stream 35 may include carbon dioxide and little to none of oxygen, nitrogen, and/or water vapor while the clean air stream 33 may include substantially the same level of oxygen, nitrogen, and/or water vapor as the input air stream 31.

Though the example of FIG. 1 illustrates that the exit port 32 may be configured to emit the clean air stream 33 into the atmosphere 14 of the enclosure 12, the clean air stream 33 may be emitted directly or indirectly into the atmosphere 14, may be reacted, mixed, or otherwise modified, and/or may be accumulated in a vessel. Also, though the example of FIG. 1 illustrates that the waste port 34 may be configured to emit the waste stream 35 out of the enclosure 12 (e.g., vented 'overboard' a spacecraft), the waste stream 35 may be expelled from the enclosure 12, may be reacted, mixed, or otherwise modified, and/or may be accumulated in a vessel.

Centrifugal air separators 20 may be configured to emit the clean air stream 33 and the waste stream 35 at a mass flow ratio of the clean air stream 33 to the waste stream 35 of at least 1:1, at least 2:1, at least 5:1, at least 10:1, at least 100:1, or at least 1000:1. Generally, the mass flow ratio may be related to the area ratio of the exit port 32 and the waste port 34. Where a centrifugal air separator 20 has a plurality of exit ports 32 and/or a plurality of waste ports 34, the mass flow ratio and the area ratio may be formed using the total flow or area, respectively, of all of the respective ports. Centrifugal air separators 20 may be configured such that the clean air stream 33 to waste stream 35 mass flow ratio (the light fraction stream to heavy fraction stream mass flow ratio) may be substantially the same as the ratio (and/or the expected ratio) of the light fraction components to the heavy fraction components in the input air stream 31 (the input stream). For example, the clean air stream 33 to waste stream 35 mass flow ratio may be about 400%, about 200%, about 150%, about 110%, about 100%, about 90%, about 70%, about 50%, about 20%, or about 10% of the ratio (and/or the expected ratio) of the light fraction components to the heavy fraction components in the input air stream 31.

Because centrifugal air separators 20 operate by separating the input air stream 31 as the stream travels through the centrifugal air separator 20, the centrifugal air separator 20 may be operated substantially continuously. Unlike adsorption systems, no regeneration of a centrifugal air separator 20 is required. Though no specific down time is required to discharge carbon dioxide or other accumulated gases, centrifugal air separators 20 may be taken out of service for convenience, maintenance, cleaning, etc. For example, particulate and/or aerosols within the input air stream 31 may accumulate within the centrifugal air separator 20 and may be removed, for example, by flushing the centrifugal air separator 20 with a solvent and/or back flushing a clean gas through the centrifugal air separator 20 (e.g. flushing gas from the exit port 32 and/or the waste port 34 to the entrance port 30).

Systems 10 and/or centrifugal air separators 20 may include an input filter, a carbon dioxide sensor 16, a controller 18, a gas sensor, an oxygen source, an oxygen sensor, a heater, a water recovery system, a water production system, and/or a humidity control apparatus. For example, input filters may be configured to remove and/or reduce particulates and/or suspended liquids (e.g., mists, aerosols, water drops, etc.) from the input air stream 31 and/or from the interior of the centrifugal air separator 20.

Carbon dioxide sensors 16 are devices configured to detect the presence, amount, partial pressure, and/or concentration of carbon dioxide in a gas. Carbon dioxide sensors 16 may be configured to sense carbon dioxide in the atmosphere 14 of the enclosure 12, the input air stream 31, the clean air stream 33, the waste stream 35, and/or within the centrifugal air separator 20. Examples of carbon dioxide sensors 16 include non-dispersive infrared carbon dioxide sensors (measurement by infrared absorbance), chemical carbon dioxide sensors (measurement by chemical reaction), MEMS (microelectromechanical system) sensors (measurement by changes in mechanical resonance and/or deflection), and mass spectrometers.

Controllers 18 may be configured to control the operation of the system 10 and/or the centrifugal air separator 20. For example, the controller 18 may be programmed to perform any of the methods described further herein. The controller 18 may be programmed to control air flow through the centrifugal air separator 20, optionally based upon a carbon dioxide level as may be sensed by carbon dioxide sensor 16 and/or inferred by another sensor (e.g., measuring oxygen levels in the clean air stream 33 and/or the waste stream 35 as a proxy for the efficiency of separation). The controller 18 may be programmed to control the rate of separation of carbon dioxide (or other gas constituents such as a higher molecular weight gas) in the centrifugal air separator 20. The controller 18 may be programmed to maintain a carbon dioxide level (e.g., a concentration or a partial pressure) in the atmosphere 14 below a threshold level. The threshold level may be a threshold deemed safe for human exposure, safe for human habitation, and/or comfortable to humans living within the enclosure 12. For example, the threshold may be less than 1 kPa (kilopascal; about 7.5 mmHg (millimeters of mercury)), less than 0.8 kPa (about 6 mmHg), less than 0.6 kPa (about 4.5 mmHg), less than 0.4 kPa (about 3 mmHg), less than 0.3 kPa (about 2 mmHg), about 0.5 kPa (about 4 mmHg), about 0.3 kPa (about 2 mmHg), and/or about 0.2 kPa (about 1 mmHg).

Controllers 18 may be any suitable device or devices that are configured to perform the functions discussed herein. For example, controllers may include one or more of an electronic controller, a dedicated controller, a special-purpose controller, a computer, a special-purpose computer, a display device, a logic device, a memory device, and/or a tangible computer-readable medium suitable for storing computer-executable instructions for implementing one or more aspects of systems and/or methods according to the present disclosure.

Figure 2:
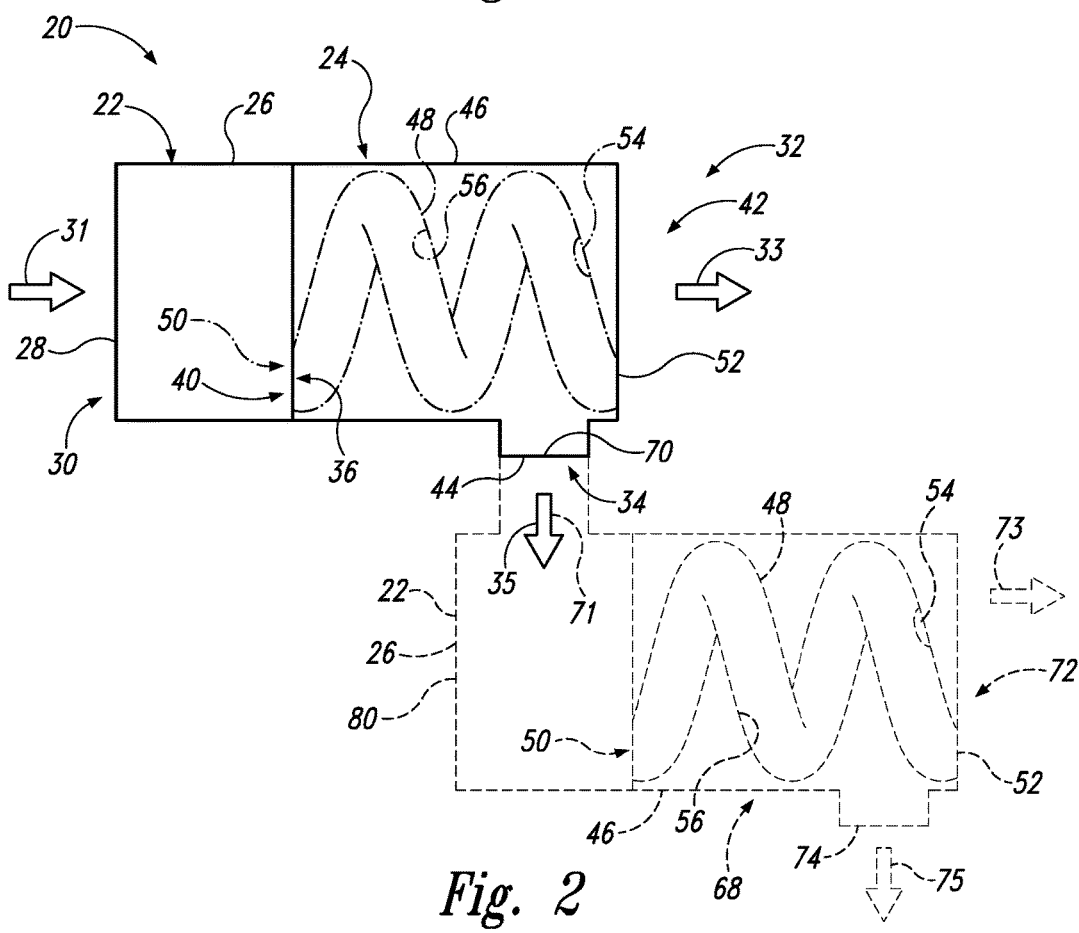
FIG. 2 is a schematic representation of a centrifugal air separator.

FIG. 2 schematically represents details of centrifugal air separators 20. Centrifugal air separators 20 include at least one drive section 22 and at least one separation section 24. Drive sections 22 have a drive section entrance port 28 and a drive section exit port 36. Separation sections 24 have an entrance port 40 (also called a separation section entrance port), an exit port 42 (also called a separation section exit port) and a waste port 44 (also called the separation section waste port). Separation sections 24 may include a plurality of entrance ports 40, a plurality of exit ports 42, and/or a plurality of waste ports 44. Generally, the waste port(s) 44 of the separation section 24 is (are) fluidically connected to at least one of the waste ports 34 of the centrifugal air separator 20. One or more of the waste ports 44 may be configured to form at least a portion of the waste port(s) 34 of the centrifugal air separator 20.

The drive section(s) 22 and the separation section(s) 24 of a centrifugal air separator 20 are connected such that gas (e.g., air) may flow from the entrance port 30 to the exit port 32 through the drive section(s) 22 and the separation section(s) 24. These sections are generally connected serially, with one section upstream (i.e., closer to the entrance port 30) of another. Where the centrifugal air separator 20 includes one drive section 22 and one separation section 24, one of the drive section 22 or the separation section 24 is located upstream of the other, i.e., gas flow generally travels from the drive section 22 to the separation section 24 or vice versa. The entrance port of the most upstream of the sections may be the entrance port 30 of the centrifugal air separator 20. The exit port of the most downstream of the sections may be the exit port 32 of the centrifugal air separator 20. Intermediate entrance port(s) and exit port(s) of the sections are fluidically connected end-to-end to form a continuous fluid path from the entrance port 30 to the exit port 32. For example, in FIG. 2, the drive section 22 is upstream of the separation section 24. The entrance port 28 of the drive section 22 is also the entrance port 30 of the centrifugal air separator 20. The exit port 36 of the drive section 22 is fluidically connected to the entrance port 40 of the separation section 24. The exit port 42 of the separation section 24 is also the exit port 32 of the centrifugal air separator 20.

Drive sections 22 are configured to direct the input air stream 31 from the atmosphere 14 of the enclosure 12 into the entrance port 30 and/or through the separation section(s) 24 (from the entrance port 40 to the exit port 42). Drive sections 22 may include a blower 26 (which also may be called a compressor, a pump, and/or a fan) that is configured to direct the input air stream 31 from the entrance port 30 through the separation section 24 (from the entrance port 40 to the exit port 42). Drive sections 22 and/or blowers 26 may be configured to drive the air (or other gas compositions) from the entrance port 30 to the exit port 32. Additionally or alternatively, drive sections 22 and/or blowers 26 may be configured to draw gas from the entrance port 30 to the exit port 32. For example, FIG. 2 schematically illustrates the drive section 22 between the entrance port 30 and the separation section 24 (i.e., generally upstream of the separation section 24). In this arrangement, the drive section 22 is generally configured to draw the input air stream 31 into the entrance port 30 and to drive the input air stream 31 through the separation section 24. Alternatively, the drive section 22 may be generally downstream of the separation section 24, e.g., between the separation section 24 and the exit port 32. Further, the centrifugal air separator 20 may include more than one drive section 22, for example, one upstream of the separation section 24 and one downstream of the separation section 24. Additionally or alternatively, drive sections 22 may include, and/or may be, a source of pressurized gas from a vessel and/or another system.

Centrifugal air separators 20 may include a vacuum source 80 to draw the waste stream 35 from the waste port 34. The vacuum source 80 may include a vacuum pump and/or a vacuum vessel. Additionally or alternatively, the vacuum source 80 may be selectively fluidically coupled to a vacuum exterior to the enclosure 12 (e.g., the vacuum of space outside a spacecraft). The vacuum source 80 may be configured to apply a sub-atmospheric pressure to the waste port 34, for example a pressure less than 100 kPa, less than 80 kPa, less than 50 kPa, or less than 10 kPa. Additionally or alternatively, the centrifugal air separator 20 and/or the vacuum source 80 may be configured to apply a negative pressure differential from the waste port 34 to the channel 56 proximate the waste port 34. For example, the pressure at the waste port 34 may be at least 10 kPa, at least 25 kPa, or at least 50 kPa less than the pressure in the channel 56 proximate the waste port 34. The pressure differential between the waste port 34 and the channel 56 may be as great as the absolute pressure in the channel 56.

Separation sections 24 are configured to separate a gas stream flowing through the separation section 24 into a light fraction stream emitted at the exit port 42 and a heavy fraction stream emitted at the waste port 44 according to the molecular weight of the components of the gas stream.

Centrifugal air separators 20 may include more than one stage of gas separation, the first stage being as described, including a drive section 22 and a separation section 24. An optional second-stage section 68 (also called a secondary section and a subsequent-stage section) is configured to further separate the gas output from the first stage, and/or prior stages. The second-stage section 68 has an entrance port 70, an exit port 72, and a waste port 74. The second-stage section 68 is configured to accept at least a portion of one of the clean air stream 33 or the waste stream 35 into the entrance port 70 as a second-stage input stream 71 and is otherwise configured like a separation section 24. For example, the second-stage section 68 is configured to separate the input stream 71 of the second-stage section 68 into a second-stage clean air stream 73 (also called a second-stage light fraction stream) and a second-stage waste stream 75 (also called a second-stage heavy fraction stream), the second-stage clean air stream 73 being discharged from the exit port 72 and the second-stage waste stream 75 being discharged from the waste port 74. Further secondary sections, when present, are configured likewise, with the first stage feeding the second stage which feeds the third stage, etc.

To further purify the waste stream 35 (e.g., to increase the amount and/or concentration of the heavier molecular weight components in the stream), the waste stream 35 may be input into the entrance port 70 of the second-stage section 68, i.e., the waste port 34 may be fluidically connected to the entrance port 70. To further purify the clean air stream 33 (e.g., to increase the amount and/or concentration of the lighter molecular weight components in the stream), the clean air stream 33 may be input into the entrance port 70 of the second-stage section 68, i.e., the clean air port 32 may be fluidically connected to the entrance port 70. To remove carbon dioxide as a waste gas from a breathable atmosphere, the waste stream 35 may be directed into the entrance port 70, the clean air stream 33 and the second-stage clean air stream 73 may be discharged into the atmosphere 14, and the second-stage waste stream 75 may be handled as would be the waste stream 35 in the absence of the second stage 68. By purifying the waste stream 35 rather than the clean air stream 33 with the second-stage section 68, more of the benign and beneficial components of the breathable atmosphere 14 may be recovered and recycled back into the atmosphere 14.

The second-stage section 68 and/or the centrifugal air separator 20 may include a drive section 22 configured to direct air (or a gas stream) through the second-stage section 68. This drive section 22 may be configured to drive and/or to draw air through the second-stage section 68.

Separation sections 24 and optional second-stage sections 68 include at least one coiled duct 48 (which also may be referred to as a spiral duct and/or a helical duct). Coiled ducts 48 have an entrance port 50 (also called a duct entrance port), an exit port 52 (also called a duct exit port), and at least one waste port 54 (also called a duct waste port). Coiled ducts 48 may include a plurality of entrance ports 50, a plurality of exit ports 52, and/or a plurality of waste ports 54.

Coiled ducts 48 define a channel 56 between the entrance port 50 and the exit port 52. The channel 56 also may be called the interior of the coiled duct 48. Coiled ducts 48 may be substantially tubular, in which case, the exterior of the coiled duct may mimic many of the features of the channel 56. However, coiled ducts 48 may define all or a portion of the channel 56 within a body that is not tubular.

The entrance port 50 of each of the coiled ducts 48 of a section (the separation section 24 or the second-stage section 68) is fluidically connected to the entrance port of the corresponding section (the entrance port 40 of the separation section 24 or the entrance port 70 of the second-stage section 68) and may be configured to form at least a portion of the entrance port of the corresponding section. The exit port 52 of each of the coiled ducts 48 of a section is fluidically connected to the exit port of the corresponding section (the exit port 42 of the separation section 24 or the exit port 72 of the second-stage section 68) and may be configured to form at least a portion of the exit port of the corresponding section. The one or more waste ports 54 of each of the coiled ducts 48 of a section are fluidically connected to the waste port of the corresponding section (the waste port 44 of the separation section 24 or the waste port 74 of the second-stage section 68). Thus, the coiled ducts 48 of a section are configured to operate in parallel within a section.

Coiled ducts 48 are configured to separate a gas stream (also referred to as a duct input gas stream) flowing into the entrance port 50 into a light fraction stream emitted at the exit port 52 and a heavy fraction stream emitted at the waste port 54 according to the molecular weight of components of the gas stream. The light fraction stream and the heavy fraction stream together are essentially the only gas output from the coiled duct 48. That is, coiled ducts 48 may emit only incidental amounts of gas besides the light fraction stream and the heavy fraction stream. The gas flow of the input gas stream and the light fraction stream are substantially the same. The gas flow of the heavy fraction stream is a small fraction of the total gas flow emitted by the coiled duct 48. For example, the flow of the heavy fraction stream may be less than 10%, less than 1%, or less than 0.1% of the flow of the light fraction stream.

Each separation section 24 and second-stage section 68 is configured to transmit at least a portion of the gas stream input to the section into the coiled duct 48 (into the entrance port 50), to transmit from the exit port of the section at least a portion of the light fraction stream emitted by the coiled duct 48 (from the exit port 52), and to transmit from the waste port of the section at least a portion of the heavy fraction stream emitted by the coiled duct 48 (from the waste port 54). Hence, the light fraction stream emitted from the coiled duct 48 may be called the duct clean air stream and the heavy fraction stream emitted from the coiled duct 48 may be called the duct waste stream.

Coiled ducts 48 are configured to separate components of the duct input gas stream according to the molecular weight of the components by directing the gas stream along the coiled channel 56 and thereby subjecting the gas to centrifugal force. The channel 56 is configured to stratify gas travelling through the channel 56 according to the molecular weight of the components of the gas due to the centrifugal force imparted on the gas as it travels the coiled channel 56.

Coiled ducts 48 and channels 56 are configured to flow the duct input gas stream in a generally laminar manner, i.e., in a manner where the turbulence of the flow is low enough and/or directed (e.g., confined to particular layers and/or regions) to permit stratification of the gas stream in a direction perpendicular to the average gas flow. The generally laminar manner may be influenced by speed (e.g., velocity, mass flow rate) of the gas flow, gas parameters (e.g., pressure, temperature, and viscosity), the shape of the channel 56, the interior profile of the channel 56, and the surface characteristics of the interior of the channel 56. Lower speeds and higher viscosity tend to encourage reduced turbulence. However, higher speeds tend to increase the centrifugal force. Smaller dimensions tend to encourage reduced turbulence.

Suitable gas flow through coiled ducts 48 and centrifugal air separators 20 may be at a velocity, mass flow rate, temperature, and/or pressure selected to stratify the gas within the coiled duct 48. The velocity of the gas flow may be at least 10 m/s (meters per second), at least 20 m/s, or at least 50 m/s. The mass flow rate of the gas flow may be at least 0.1 g/s (grams per second), at least 0.5 g/s, at least 2 g/s, or at least 5 g/s. The temperature of the gas flow may be selected to be non-condensing and/or near standard room temperature (e.g., 0° C.-50° C.). The temperature of the gas flow through a coiled duct 48 may increase as the gas flows through the coiled duct 48, e.g., due to friction of the gas flow. The coiled ducts 48 may include and/or may be in thermal contact with heat sinks, chillers, and/or heat exchangers to maintain, increase, and/or decrease the temperature of the gas flow as it flows through the coiled duct 48. The pressure of the input gas flow may be selected to be near standard atmospheric pressure (e.g., 70-110 kPa), at the pressure induced by the drive section 22, which may be higher or lower than standard atmospheric pressure, and/or at the pressure of a gas source used in addition to or as an alternative to the drive section 22. Centrifugal air separators 20 and/or coiled ducts 48 may be configured to produce a pressure differential between the entrance port 30 and the exit port 32 and/or between the duct entrance port 50 and the duct exit port 52 of less than 100 kPa, less than 60 kPa, or less than 30 kPa when gas is flowing with a mass flow rate of 2.5 g/s from the respective entrance port.

The profile of the channel 56 (e.g., as characterized by its effective diameter) may be substantially uniform along the channel 56, may taper toward the duct entrance port 50, or may taper toward the duct exit port 52. The profile of the channel 56 may be substantially circular, substantially elliptical, substantially ovate, and/or rounded. The average effective diameter of the channel 56 may be at least 0.1 cm (centimeters), at least 0.2 cm, at least 0.5 cm, at least 1 cm, at most 100 cm, at most 50 cm, at most 20 cm, at most 10 cm, at most 5 cm, and/or at most 2 cm.

Coiled ducts 48 and channels 56 may include a coiled portion, a spiral portion, and/or a helical portion in which the channel 56 is coiled, spiral, and/or helical, respectively. Coiled ducts 48 and channels 56 may include a series of loops, for example, at least 5, at least 10, less than 50, and/or less than 100 loops. The loops may be, and/or may include one or more portions that are, substantially helical and/or substantially spiral. Loop shapes generally are smooth. Abrupt changes in the direction of the channel 56 may induce turbulence into the gas flow. Larger (looser) loops tend to contribute to smoother air flow, while smaller (tighter) loops tend to induce greater centrifugal force in the gas. The effective diameter of a series of loops may be substantially uniform, tapered toward the duct entrance port 50, or tapered toward the duct exit port 52. The average effective diameter of a series of loops may be at least 1, at least 2, at least 3, at least 5, at most 10, and/or at most 5 times the average effective diameter of the channel 56. Two or more of the loops may be essentially in contact with each other (e.g., the portions of the channel 56 within the loops may be separated by a shared wall). Additionally or alternatively, two or more of the loops may be spaced apart from each other, for example, by at least 0.1, at least 0.5, at least 1, at most 10, and/or at most 5 times the average effective diameter of the channel 56.

Coiled ducts 48 and/or channels 56 may be sized to remove a selected gas in the waste stream 35 at a specified rate. For example, coiled ducts 48 and/or channels 56 may be sized to remove carbon dioxide from the input air stream 31 at a rate comparable to the rate of production within the enclosure 12. Sizing of the coiled ducts 48 and/or the channels 56 may include selecting the channel area, the channel effective diameter, the channel profile, the channel length, the coil (loop) curvature, the number of loops, the area of the duct entrance port 50, the area of the duct exit port 52, the area of the duct waste port(s) 54, and/or the placement of the duct waste port(s) 54. For carbon dioxide, the target rate of removal may be less than 0.1 g/s (about 10 kg per day), less than 0.03 g/s, less than 0.01 g/s, less than 0.003 g/s, or less than 0.001 g/s. For example, separation sections 24 may be configured to remove carbon dioxide at a target removal rate (e.g., the rate of production within the enclosure 12). Hence, a coiled duct 48 in a separation section 24 with a single coiled duct 48 may be sized to remove carbon dioxide at the target removal rate. Each coiled duct 48 in a separation section 24 with a plurality of coiled ducts 48 may be sized to remove carbon dioxide at a portion (e.g., an equal portion) of the target removal rate.

Coiled ducts 48 may include and/or may be composed of suitably resilient and gas tight materials such as metal, plastic, glass, etc. Coiled ducts 48 may be configured to be substantially gas impermeable under operating conditions (with gas flowing as described herein, e.g., at about standard pressure (about 100 kPa) and temperature (about 20° C.)). Coiled ducts 48 may be, or include portions that are, rigid, flexible, heat conductive, and/or heat insulating. Coiled ducts 48 and/or centrifugal air separators 20 may include vibration dampening materials and/or insulation to reduce vibrations in the coiled ducts 48 and/or to isolate vibrations of the coiled ducts 48 from the environment outside the centrifugal air separators 20.

Figure 3:
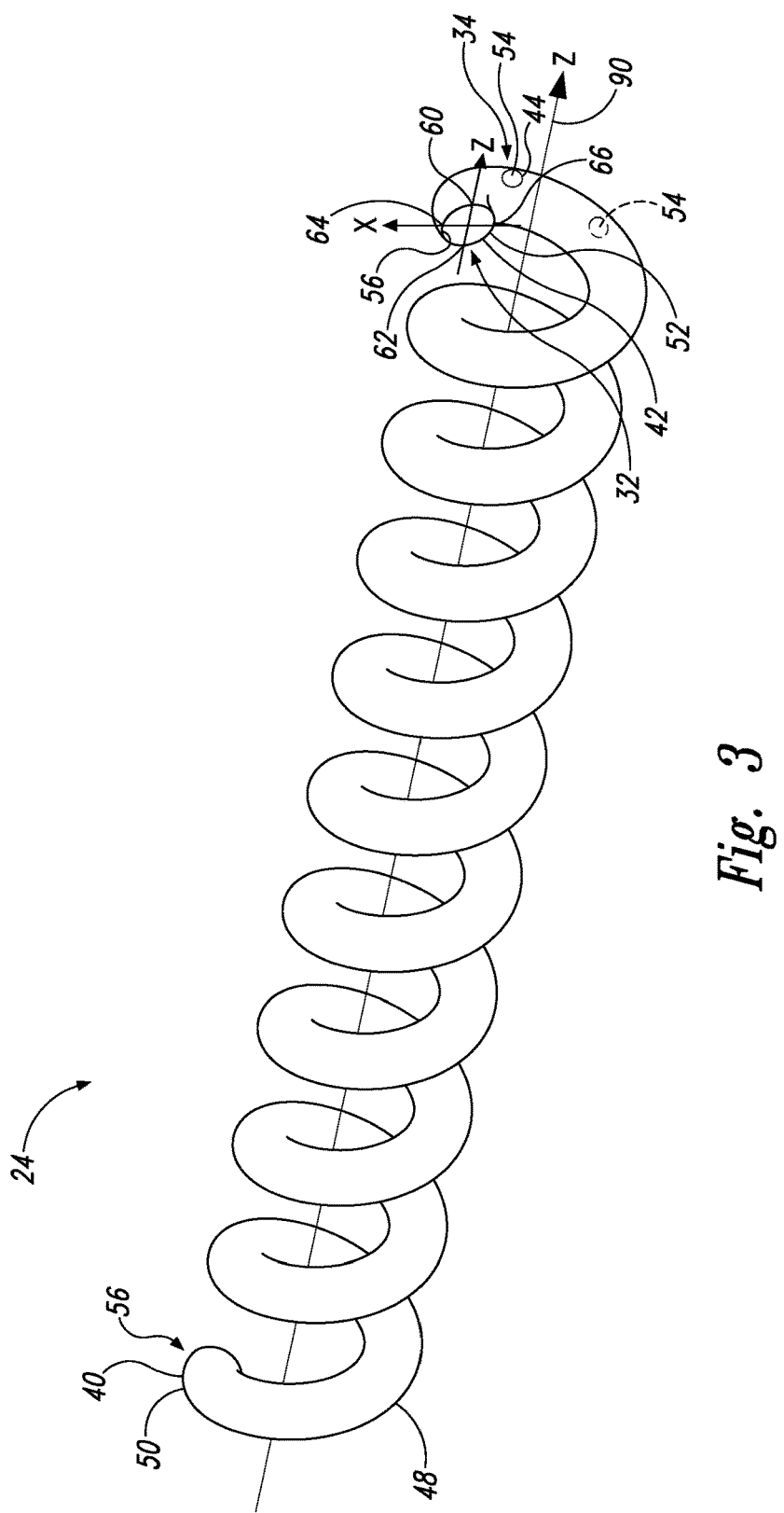
FIG. 3 is a perspective view of an example of a separation section of a centrifugal air separator.

FIG. 3 illustrates an example of a coiled duct 48 that is tubular and that defines a substantially helical channel 56. Coiled ducts 48 are configured with a principal direction 90 of gas flow that is the direction from the entrance port 50 to the exit port 52. In the example of FIG. 3, the principal direction 90 is the direction along the axis of the helix from the entrance port 50 to the exit port 52 (also indicated as the z-axis). The channel 56 may be described in terms of a leading edge region 60 and a trailing edge region 62 with respect to the principal direction 90, as indicated at the opening of the channel 56 at the exit port 52 in FIG. 3. The leading edge region 60 of the channel 56 is the forward region with respect to the principal direction 90 (the edge region toward the exit port 52). The trailing edge region 62 of the channel 56 is the rearward region with respect to the principal direction 90 (the edge region toward the entrance port 50). Though the edge regions are only indicated for the opening of the channel 56 at the exit port 52, any cross section or profile of the channel 56 may be characterized with a leading edge region 60 and a trailing edge region 62, unless the channel 56 happens to be parallel to the principal direction 90. Thus, each loop of the channel 56 may be described with a leading edge region 60 that faces forward with respect to the principal direction 90 and a trailing edge region 62 that faces rearward with respect to the principal direction 90.

Further, the channel 56 may be described in terms of an outside edge region 64 and an inside edge region 66 with respect to the loops. The outside edge region 64 of the channel 56 is the edge region along the outside of the curvature of the channel 56 (i.e., along the outside of the loops). The inside edge region 66 of the channel 56 is the edge region along the inside of the curvature of the channel 56 (i.e., along the inside of the loops). For a channel 56 with substantially parallel walls, the outside edge region 64 has a larger radius of curvature than the inside edge region 66. In FIG. 3, the direction that distinguishes the outside edge region 64 from the inside edge region 66 is indicated as the x-direction.

As gas flows through the channel 56, the gas experiences a centrifugal force generally in the x-direction (i.e., away from the local center of curvature of the channel 56). In some flow conditions and channel configurations, gas may stratify along the x-direction (with heavier components generally drawn toward the outside edge region 64). In some flow conditions and channel configurations, gas may stratify along the principal direction 90 (with heavier components generally drawn toward the leading edge region 60). Hence, the channel 56 may be configured to stratify the gas along the x-direction, the principal direction 90 (the z-direction), and/or a direction between the x-direction and the principal direction 90. The channel 56 may be configured to concentrate heavier gases along the leading edge region 60, the outside edge region 64, and/or an edge region from the leading edge region 60 to the outside edge region 64.

All of the one or more waste ports 54 of the coiled duct 48 are proximate the exit port 52 of the coiled duct 48. The waste port(s) 54 may be fluidically connected to the channel 56 in an end region of the channel 56. The end region of the channel 56 may be less than 20%, less than 10%, or less than 5% of the length of the channel 56. The end region may be the last 20%, 10%, or 5% of the loops of the channel 56 (e.g., the last 5, 4, 3, 2, or 1 loops). The waste port(s) 54 of the coiled duct 48 may be fluidically connected to the channel 56 within the leading edge region 60, the outside edge region 64, and/or between the leading edge region 60 and the outside edge region 64. For example, FIG. 3 illustrates several optional waste ports 54 generally within the leading edge region 60. The connection of the waste ports 54 may be exclusively in the leading edge region 60, the outside edge region 64, and/or between the leading edge region 60 and the outside edge region 64. For example, the waste port(s) 54 of the coiled duct 48 may be fluidically connected to the channel 56 only within the leading edge region 60. As another example, the waste port(s) 54 of the coiled duct 48 may be fluidically connected to the channel 56 only within the outside edge region 64.

Coiled ducts 48 may be configured to emit the duct clean air stream and the duct waste stream at a mass flow ratio of the duct clean air stream to the duct waste stream of at least 1:1, at least 2:1, at least 5:1, at least 10:1, at least 100:1, or at least 1000:1. Generally, the mass flow ratio may be related to the area ratio of the exit port 52 and the waste port(s) 54. Where a coiled duct 48 has a plurality of waste ports 54, the mass flow ratio and the area ratio may be formed using the total flow or area, respectively, of the waste ports 54. Each waste port 54 may have an effective diameter that is less than 50%, less than 20%, less than 10%, less than 3%, or less than 1% of the effective diameter of the channel 56 proximate the waste port 54. Each waste port 54 may have an effective diameter that is less than 50%, less than 20%, less than 10%, less than 3%, or less than 1% of the effective diameter of the exit port 52. Though relatively small, waste ports 54 are apertures, passages, channels, or the like that are large enough to transmit gas of the heavy fraction stream. Waste ports 54 may have an effective diameter greater than 0.001 mm (millimeters), greater than 0.01 mm, or greater than 0.1 mm.

Figure 4:
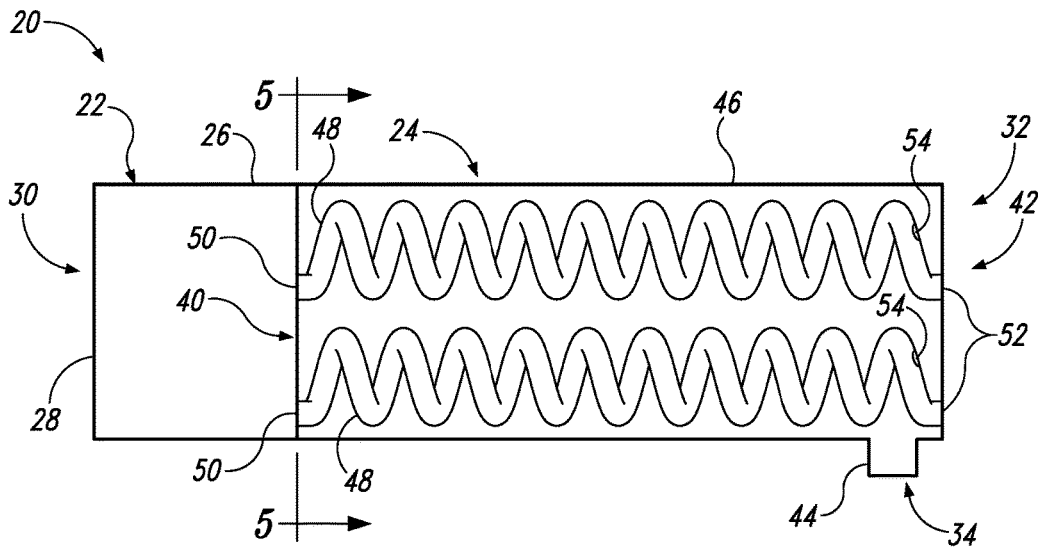
FIG. 4 is a schematic representation of a centrifugal air separator with a plurality of coiled ducts.

As shown in the examples of FIGS. 2 and 4, separation sections 24 and second-stage sections 68 may include a waste collection body 46 that is configured to collect and/or to combine waste stream(s) (heavy fraction streams) from the coiled duct(s) 48 (emitted by the waste port(s) 54) and to direct the collected waste gas to the waste port 44 or the second-stage waste port 74, respectively. The waste collection body 46 generally fluidically connects one or more of the waste ports 54 of the coiled duct(s) 48 to the respective waste port 44 or second-stage waste port 74. The waste collection body 46 may define the respective waste port 44 or second-stage waste port 74. The waste collection body 46 may define a passage from the waste port(s) 54 of the coiled duct(s) 48 to the respective waste port 44 or second-stage waste port 74. The waste collection body 46 may define a volume that contains at least a portion of the coiled duct proximate the waste port(s) 54. The waste collection body 46 may substantially cover and/or form a sheath over the coiled duct(s) 48. Alternatively, the waste collection body 46 may only substantially cover the waste port(s) 54.

As shown in the example of FIG. 4, separation sections 24 may include a plurality of coiled ducts 48. Generally, the coiled ducts 48 are configured to operate (separate gas) in parallel and each is configured to operate on a portion of the input air stream 31. Each of the coiled ducts 48 may be substantially identical, configured for substantially the same input gas flow, and/or configured for substantially the same waste gas flow (i.e., heavy fraction flow). The centrifugal air separator 20 may include an optional input manifold configured to divide the input air stream among the plurality of coiled ducts 48. The input manifold may be configured to substantially evenly split the input air stream among the coiled ducts 48. The centrifugal air separator 20 may include an optional output manifold configured to combine the light fraction output streams (the clean air streams) of the plurality of coiled ducts into the clean air stream 33.

Second-stage sections 68 may include a plurality of coiled ducts 48 in the same manner that separation sections 24 may include a plurality of coiled ducts 48. However, second-stage sections 68 do not necessarily have the same number or configuration of coiled ducts 48 as the corresponding separation section 24 of the centrifugal air separator 20.

Where a separation section 24 of a centrifugal air separator 20 has a plurality of coiled ducts 48, the drive section(s) 22 of the centrifugal air separator 20 may be configured to direct gas through each of the entrance ports 50 of the coiled ducts 48, for example, driving gas and/or drawing gas from each of the entrance ports 50 to the respective exit ports 52. Drive sections 22 may serve one or more of the plurality of coiled ducts 48. For example, centrifugal air separators 20 may include a drive section 22 for each coiled duct 48. Alternatively, centrifugal air separators 20 may include a single drive section 22 to direct gas through all of the plurality of coiled ducts 48. Similarly, a drive section 22 may include one or more blowers 26 that serve one or more coiled ducts 48. For example, a drive section 22 may include one blower 26 for each coiled duct 48. As another example, a drive section 22 may include a single blower 26 for all of the coiled ducts 48 served by the drive section 22.

Figure 5:
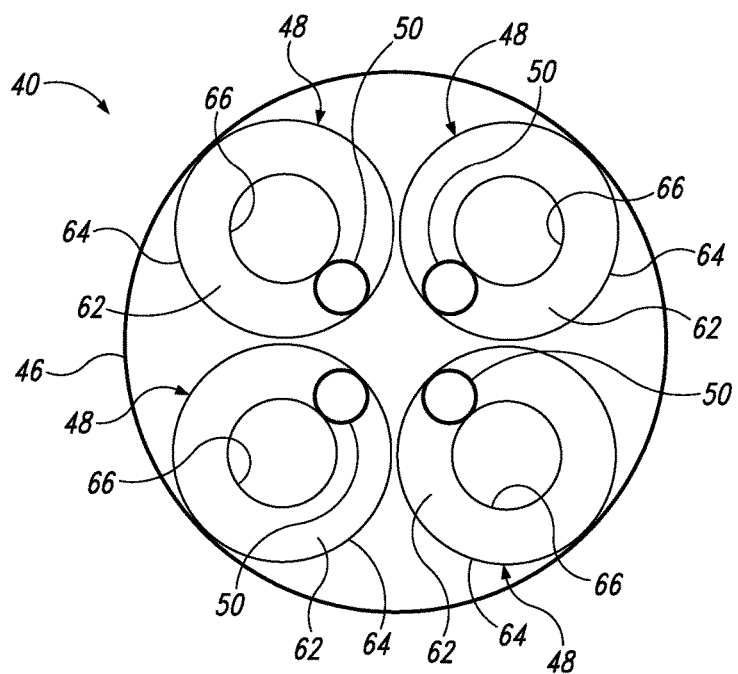
FIG. 5 is cross-sectional view of the interface between the drive section and the separation section of FIG. 4, along the section line 5-5.

FIG. 5 illustrates the interface between the drive section 22 and the separation section 24 shown in FIG. 4 (and as indicated by section line 5-5). Specifically, FIG. 5 shows the entrance port 40 of the separation section 24 configured to group the entrance ports 50 of the plurality of coiled ducts 48 towards the center of the separation section 24. The drive section exit port 36 may be configured to direct gas substantially only through the entrance ports 50 of the coiled ducts.

Further, FIG. 5 illustrates the packing of 4 similar-sized coiled ducts 48 together within a single waste collection body 46 that substantially encloses the coiled ducts 48. The coiled ducts 48 are arranged as parallel helical coils packed nearly in contact with each other. A plurality of coiled ducts 48 may be interleaved and/or nested to reduce the total volume used by the separation section 24 (or second-stage section 68).

The trailing edge regions 62 of the coiled ducts 48 of FIG. 5 are visible from the entrance port 40. For reference, the outside edge regions 64 and the inside edge regions 66 of each of the coiled ducts 48 are indicated. From the view of FIG. 5, the leading edge regions 60 of each of the coiled ducts 48 would be below each loop toward the exit port 42.

Figure 6:
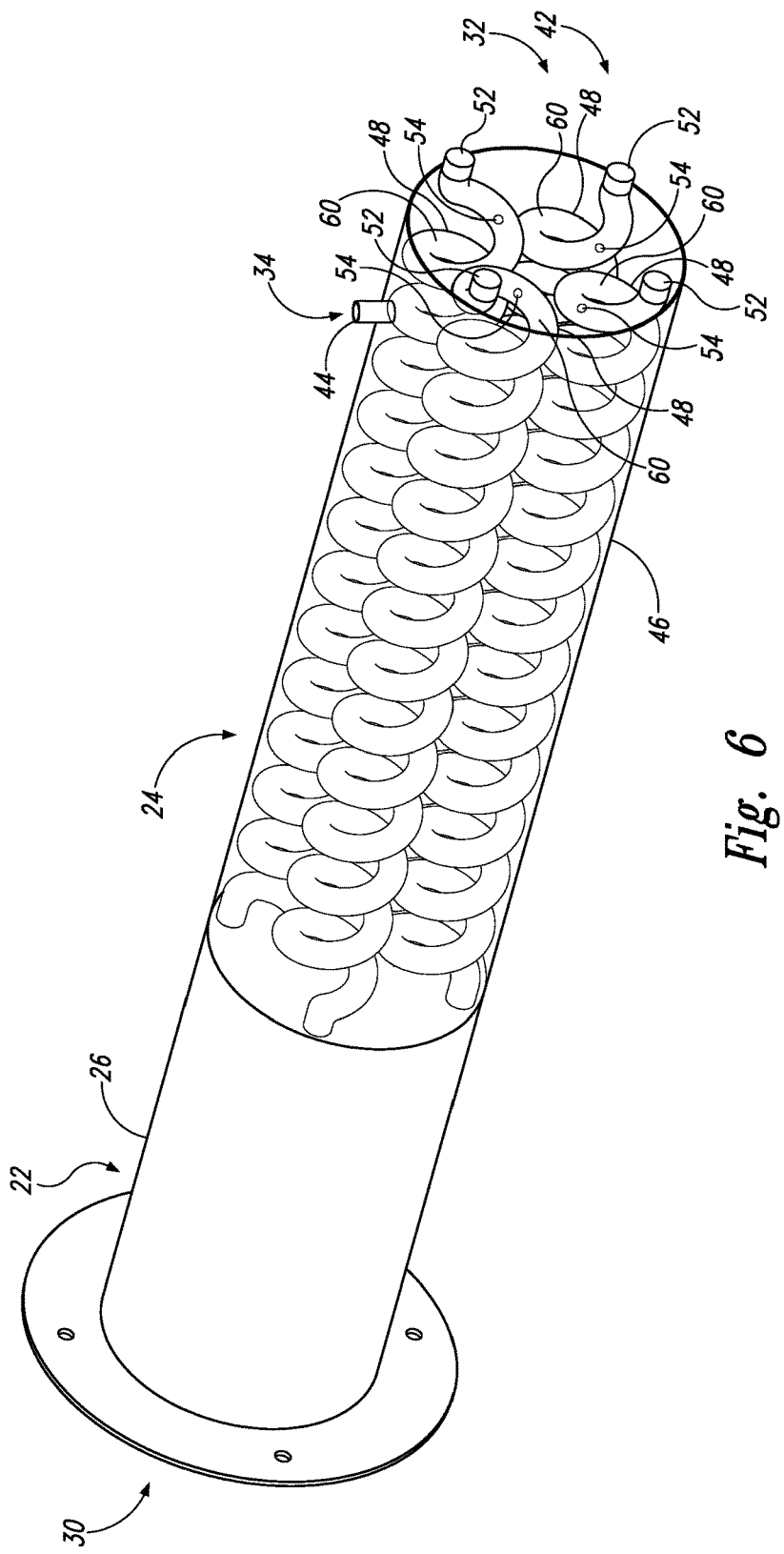
FIG. 6 is a perspective view of an example of a centrifugal air separator with a plurality of coiled ducts.

FIG. 6 illustrates an example of a centrifugal air separator 20 with a plurality of coiled ducts 48 in the separation section 24. Additionally, the exit port 42 of the separation section 24 (which is the exit port 32 of the centrifugal air separator 20) is illustrated. The exit port 42 is configured to expose the exit ports 52 of the coiled ducts 48. The waste ports 54 of the coiled ducts 48 are enclosed within the waste collection body 46 (which is illustrated as transparent). The waste ports 54 are shown in the leading edge regions 60 of the coiled ducts 48.

Figure 7:
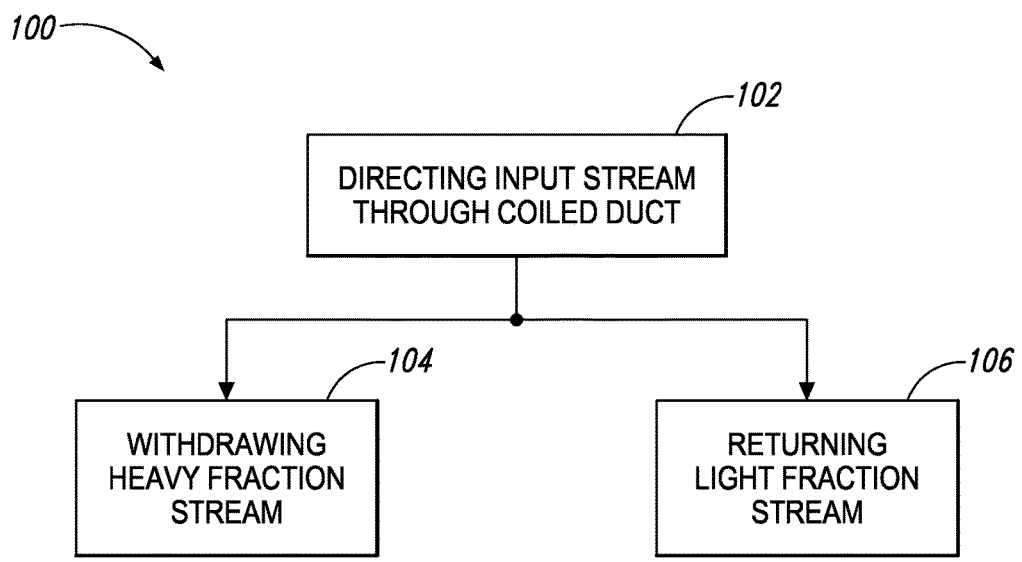
FIG. 7 is a schematic representation of methods of separating gas by molecular weight.

FIG. 7 schematically represents methods 100 according to the present disclosure. Methods 100 generally are methods of separating gas such as recirculating clean air in an atmosphere of an enclosure by separating carbon dioxide or other higher molecular weight components such as contaminants.

Methods 100 include directing 102 an input stream of gas (such as input air stream 31) through a coiled duct (such as coiled duct 48) to centrifugally separate the gas according to the molecular weight of components of the gas into a light fraction stream and a heavy fraction stream. For applications such as purifying air for life support, reducing/maintaining the concentration of carbon dioxide within an enclosure, and/or recycling the atmosphere within an enclosure, the heavy fraction stream may be relatively enriched in carbon dioxide as compared to the light fraction stream. Directing 102 may include directing input air from the atmosphere of an enclosure through the coiled duct at a rate to stratify the air within the coiled duct. Directing 102 may include directing the input stream of gas through the centrifugal air separator 20.

Methods 100 may include withdrawing 104 the heavy fraction stream (such as the waste stream 35) from the coiled duct, for example to direct the heavy fraction stream away from the coiled duct. For applications such as purifying air for life support and/or reducing/maintaining the concentration of carbon dioxide within an enclosure, the heavy fraction stream may be accumulated, e.g., in a vessel, and/or directed out of the enclosure, e.g., overboard a spacecraft, into a vessel, and/or to a chemical processing system (such as a water production system).

Methods 100 may include accumulating the light fraction stream and/or using the light fraction stream. For applications such as purifying air for life support and/or recycling the atmosphere within an enclosure, methods 100 may include returning 106 the light fraction stream from the coiled duct to the atmosphere of the enclosure.

Methods 100 may include sensing a concentration and/or a partial pressure of carbon dioxide in the atmosphere of an enclosure, the input stream of gas, the heavy fraction stream, and/or the light fraction stream.

Methods 100 may include determining a quantity related to a rate of production of carbon dioxide within an enclosure. The quantity may be a number of people within the enclosure, a level of carbon dioxide in the atmosphere of the enclosure, a level of carbon dioxide in the input stream, a level of carbon dioxide in the heavy fraction stream, a level of carbon dioxide in the light fraction stream, and the rate of production of carbon dioxide within the enclosure. Methods 100 may include selecting the number of coiled ducts based at least in part upon the quantity related to the rate of production of carbon dioxide. Methods 100 may include controlling the level (e.g., the concentration, the partial pressure, and/or the amount) of carbon dioxide in the atmosphere of the enclosure by directing the input stream through a number of coiled ducts based at least in part upon the quantity related to the rate of production of carbon dioxide. Controlling may include controlling the rate of separation of carbon dioxide (or other higher molecular weight gas) in the coiled duct. Controlling may include maintaining the carbon dioxide level (e.g., a concentration or a partial pressure) in the atmosphere of the enclosure below a threshold level. The threshold level may be a threshold deemed safe for human exposure, safe for human habitation, and/or comfortable to humans living within the enclosure. For example, controlling may include maintaining the partial pressure of carbon dioxide in the atmosphere of the enclosure at a partial pressure of less than 1 kPa, less than 0.8 kPa, less than 0.6 kPa, less than 0.4 kPa, less than 0.3 kPa, about 0.5 kPa, about 0.3 kPa, and/or about 0.2 kPa.

Examples of inventive subject matter according to the present disclosure are described in the following enumerated paragraphs.

A1. A centrifugal air separator comprising:

a separation section including a coiled duct, wherein the separation section has an entrance port, an exit port, and a waste port; and a drive section configured to direct an input air stream from an atmosphere of an enclosure into the entrance port, wherein the separation section is configured to separate the input air stream into a clean air stream emitted from the exit port and a waste stream emitted from the waste port;

wherein the coiled duct has a duct entrance port fluidically connected to the entrance port, a duct exit port fluidically connected to the exit port, and a duct waste port fluidically connected to the waste port;

wherein the coiled duct defines a channel between the duct entrance port and the duct exit port, wherein the duct waste port is proximate the duct exit port and fluidically connected to the channel;

wherein the separation section is configured to transmit through the duct entrance port a duct input air stream that is at least a portion of the input air stream and to at least partially separate the duct input air stream according to a molecular weight of components of the duct input air stream into a duct clean air stream that is at least a portion of the clean air stream and a duct waste stream that is at least a portion of the waste stream.

A2. The centrifugal air separator of paragraph A1, wherein the separation section includes the input air stream at the entrance port, the clean air stream at the exit port, and the waste stream at the waste port.

A3. The centrifugal air separator of any of paragraphs A1-A2, wherein the coiled duct includes the duct input air stream at the duct entrance port, the duct clean air stream at the duct exit port, and the duct waste stream at the duct waste port.

A4. The centrifugal air separator of any of paragraphs A1-A3, wherein the waste stream is relatively enriched in higher molecular weight components as compared to the clean air stream and optionally wherein the higher molecular weight components include carbon dioxide.

A5. The centrifugal air separator of any of paragraphs A1-A4, wherein the clean air stream is relatively depleted of higher molecular weight components as compared to the waste stream and wherein the higher molecular weight components include carbon dioxide.

A6. The centrifugal air separator of any of paragraphs A1-A5, wherein the clean air stream has a reduced concentration of gas having a molecular weight greater than 42 relative to the waste stream.

A7. The centrifugal air separator of any of paragraphs A1-A6, wherein the clean air stream has a reduced concentration of carbon dioxide relative to the waste stream.

A8. The centrifugal air separator of any of paragraphs A1-A7, wherein the clean air stream has a lesser concentration of carbon dioxide than the input air stream.

A9. The centrifugal air separator of any of paragraphs A1-A8, wherein the waste stream has a greater concentration of carbon dioxide than the input air stream.

A10. The centrifugal air separator of any of paragraphs A1-A9, wherein the waste stream has a reduced concentration of at least one of oxygen, nitrogen, and water vapor relative to the input air stream.

A11. The centrifugal air separator of any of paragraphs A1-A10, wherein the channel is configured to flow the duct input air stream in a generally laminar manner.

A12. The centrifugal air separator of any of paragraphs A1-A11, wherein the centrifugal air separator is configured to flow the duct input air stream with a velocity of at least 10 m/s.

A13. The centrifugal air separator of any of paragraphs A1-A12, wherein the centrifugal air separator is configured to flow the duct input air stream with a mass flow rate of at least 0.1 g/s or at least 0.5 g/s.

A14. The centrifugal air separator of any of paragraphs A1-A13, wherein the centrifugal air separator is configured to flow the input air stream with a mass flow rate of at least 0.5 g/s, at least 2 g/s, or at least 5 g/s.

A15. The centrifugal air separator of any of paragraphs A1-A14, wherein the coiled duct is configured to produce a pressure differential between the duct entrance port and the duct exit port of less than 100 kPa, less than 60 kPa, or less than 30 kPa when the duct input air stream is flowing with a mass flow rate of 2.5 g/s.

A16. The centrifugal air separator of any of paragraphs A1-A15, wherein the channel has an effective diameter that is substantially uniform along the channel.

A17. The centrifugal air separator of any of paragraphs A1-A16, wherein the channel has a profile that is substantially uniform along the channel.

A18. The centrifugal air separator of any of paragraphs A1-A17, wherein the channel has a profile that is at least one of substantially circular, substantially elliptical, substantially ovate, and rounded.

A19. The centrifugal air separator of any of paragraphs A1-A18, wherein the channel includes at least one of a coiled portion, a spiral portion, and a helical portion.

A20. The centrifugal air separator of any of paragraphs A1-A19, wherein the coiled duct has a series of loops.

A20.1. The centrifugal air separator of paragraph A20, wherein the coiled duct has at least 5, at least 10, less than 50, and/or less than 100 loops.

A20.2. The centrifugal air separator of any of paragraphs A20-A20.1, wherein the series of loops has an effective diameter that is one of substantially uniform, tapered toward the duct entrance port, or tapered toward the duct exit port.

A20.3. The centrifugal air separator of any of paragraphs A20-A20.2, wherein an average effective diameter of the series of loops is at least 1, at least 2, at least 3, at least 5, at most 10, and/or at most 5 times an average effective diameter of the channel.

A20.4. The centrifugal air separator of any of paragraphs A20-A20.3, wherein the series of loops is substantially helical.

A20.5. The centrifugal air separator of any of paragraphs A20-A20.4, wherein the loops of the series of loops are spaced apart from each other, optionally by at least 0.1, at least 0.5, at least 1, at most 10, and/or at most 5 times an/the average effective diameter of the channel.

A21. The centrifugal air separator of any of paragraphs A1-A20.5, wherein the channel has an average effective diameter of at least 0.1 cm, at least 0.2 cm, at least 0.5 cm, at least 1 cm, at most 100 cm, at most 50 cm, at most 20 cm, at most 10 cm, at most 5 cm, and/or at most 2 cm.

A22. The centrifugal air separator of any of paragraphs A1-A21, wherein the duct waste port is fluidically connected to an end region of the channel, wherein the end region comprises the duct exit port and one of less than 20%, less than 10%, or less than 5% of a length of the channel.

A23. The centrifugal air separator of any of paragraphs A1-A22, wherein the duct waste port is fluidically connected to the channel within a leading edge region of the channel proximate the duct exit port, within an outside edge region of the channel proximate the duct exit port, and/or between the leading edge region and the outside edge region.

A24. The centrifugal air separator of any of paragraphs A1-A23, wherein the duct waste port has an effective diameter that is less than 50%, less than 20%, less than 10%, less than 3%, or less than 1% of an effective diameter of the channel proximate the duct waste port.

A25. The centrifugal air separator of any of paragraphs A1-A24, wherein the duct waste port has an effective diameter that is less than 50%, less than 20%, less than 10%, less than 3%, or less than 1% of an effective diameter of the duct exit port.

A26. The centrifugal air separator of any of paragraphs A1-A25, wherein the coiled duct is configured to emit the duct clean air stream and the duct waste stream at a mass flow ratio of the duct clean air stream to the duct waste stream of at least 1:1, at least 2:1, at least 5:1, at least 10:1, at least 100:1, or at least 1000:1.

A27. The centrifugal air separator of any of paragraphs A1-A26, wherein the coiled duct includes a plurality of duct waste ports proximate the duct exit port.

A28. The centrifugal air separator of any of paragraphs A1-A27, wherein the drive section is configured to direct the input stream from the entrance port through the separation section and/or the coiled duct.

A29. The centrifugal air separator of any of paragraphs A1-A28, wherein the drive section is configured to drive air from the entrance port to the exit port and/or to drive air from the duct entrance port to the duct exit port.

A30. The centrifugal air separator of any of paragraphs A1-A29, wherein the drive section is configured to draw air from the entrance port to the exit port and/or to draw air from the duct entrance port to the duct exit port.

A31. The centrifugal air separator of any of paragraphs A1-A30, wherein the drive section includes a blower configured to direct the input stream from the entrance port through the separation section.

A31.1. The centrifugal air separator of paragraph A31, wherein the blower is configured to drive air from the entrance port to the exit port and/or to drive air from the duct entrance port to the duct exit port.

A31.2. The centrifugal air separator of any of paragraphs A31-A31.1, wherein the blower is configured to draw air from the entrance port to the exit port and/or to draw air from the duct entrance port to the duct exit port.

A32. The centrifugal air separator of any of paragraphs A1-A31.2, further comprising a waste collection body.

A32.1. The centrifugal air separator of paragraph A32, wherein the waste collection body fluidically connects the duct waste port and the waste port.

A32.2. The centrifugal air separator of any of paragraphs A32-A32.1, wherein the waste collection body is configured to direct the duct waste stream to the waste port.

A32.3. The centrifugal air separator of any of paragraphs A32-A32.2, wherein the waste collection body defines the waste port.

A32.4. The centrifugal air separator of any of paragraphs A32-A32.3, wherein the waste collection body forms a sheath over the coiled duct.

A32.5. The centrifugal air separator of any of paragraphs A32-A32.4, wherein the waste collection body substantially covers the coiled duct.

A32.6. The centrifugal air separator of any of paragraphs A32-A32.5, wherein the waste collection body defines a volume that contains at least a portion of the coiled duct proximate the duct waste port.

A33. The centrifugal air separator of any of paragraphs A1-A32.6, further comprising a vacuum source coupled to the waste port.

A33.1. The centrifugal air separator of paragraph A33, wherein the vacuum source is configured to apply a sub-atmospheric pressure to the waste port, optionally wherein the sub-atmospheric pressure is less than 100 kPa, less than 80 kPa, less than 50 kPa, or less than 10 kPa.

A33.2. The centrifugal air separator of any of paragraphs A33-A33.1, wherein the vacuum source includes at least one of a vacuum pump and a vacuum vessel.

A33.3. The centrifugal air separator of any of paragraphs A33-A33.2, wherein the vacuum source is configured to apply a negative pressure differential from the waste port to the channel proximate the waste port, and optionally wherein the negative pressure differential has a magnitude of at least 10 kPa, at least 25 kPa, or at least 50 kPa.

A34. The centrifugal air separator of any of paragraphs A1-A33.3, wherein the separation section includes a plurality of coiled ducts.

A34.1. The centrifugal air separator of paragraph A34, wherein the drive section is configured to direct air through the duct entrance port of each of the coiled ducts.

A34.2. The centrifugal air separator of any of paragraphs A34-A34.1, wherein the drive section is configured to drive air through each of the coiled ducts, optionally from the respective duct entrance port to the respective duct exit port.

A34.3. The centrifugal air separator of any of paragraphs A34-A34.2, wherein the drive section is configured to draw air through each of the coiled ducts, optionally from the respective duct entrance port to the respective duct exit port.

A34.4. The centrifugal air separator of any of paragraphs A34-A34.3, wherein the drive section includes a/the blower configured to direct air through the duct entrance port of each of the coiled ducts.

A34.4.1. The centrifugal air separator of paragraph A34.4, wherein the blower is configured to drive air through each of the coiled ducts, optionally from the respective duct entrance port to the respective duct exit port.

A34.4.2. The centrifugal air separator of any of paragraphs A34.4-A34.4.1, wherein the blower is configured to draw air through each of the coiled ducts, optionally from the respective duct entrance port to the respective duct exit port.

A34.5. The centrifugal air separator of any of paragraphs A34-A34.4.2, wherein the coiled ducts are substantially identical.

A34.6. The centrifugal air separator of any of paragraphs A34-A34.5, further comprising an input manifold configured to substantially evenly split the input air stream into individual duct input air streams for the coiled ducts.

A34.7. The centrifugal air separator of any of paragraphs A34-A34.6, further comprising an output manifold configured to combine the duct clean air streams of the coiled ducts into the clean air stream.

A34.8. The centrifugal air separator of any of paragraphs A34-A34.7, further comprising a/the waste collection body configured to combine the duct waste streams into the waste stream.

A35. The centrifugal air separator of any of paragraphs A1-A34.8, further comprising:

a second-stage section including a second-stage coiled duct, wherein the second-stage section has a second-stage entrance port, a second-stage exit port, and a second-stage waste port, wherein the waste port is fluidically connected to the second-stage entrance port, wherein the second-stage section is configured to separate the waste stream into a second-stage clean air stream emitted from the second-stage exit port and a second-stage waste stream emitted from the second-stage waste port;

wherein the second-stage coiled duct has a second-stage duct entrance port fluidically connected to the second-stage entrance port, a second-stage duct exit port fluidically connect to the second-stage exit port, and a second-stage duct waste port fluidically connected to the second-stage waste port;

wherein the second-stage coiled duct defines a second-stage channel between the second-stage duct entrance port and the second-stage duct exit port, wherein the second-stage duct waste port is proximate the second-stage duct exit port and fluidically connected to the second-stage channel;

wherein the second-stage section is configured to transmit through the second-stage duct entrance port a second-stage duct input air stream that is at least a portion of the waste stream and to at least partially separate the second-stage duct input air stream according to a molecular weight of components of the second-stage duct input air stream into a second-stage duct clean air stream that is at least a portion of the second-stage clean air stream and a second-stage duct waste stream that is at least a portion of the second-stage waste stream.

A35.1. The centrifugal air separator of paragraph A35, wherein the second-stage section has any of the features of the separation section of any of paragraphs A1-A34.8.

A35.2. The centrifugal air separator of any of paragraphs A35-A35.1, wherein the second-stage section includes a blower to direct the waste air stream from the waste port toward the second-stage exit port.

A36. The centrifugal air separator of any of paragraphs A1-A35.2, further comprising a carbon dioxide sensor configured to sense at least one of a concentration and a partial pressure of carbon dioxide in at least one of the atmosphere of the enclosure, the input air stream, the clean air stream, and the waste stream.

A37. The centrifugal air separator of any of paragraphs A1-A36, further comprising a controller.

A37.1. The centrifugal air separator of paragraph A37, wherein the controller is programmed to control air flow through centrifugal air separator, optionally based upon at least one of a concentration and a partial pressure of carbon dioxide in at least one of the atmosphere of the enclosure, the input air stream, the clean air stream, and the waste stream.

A37.2. The centrifugal air separator of any of paragraphs A37-A37.1, wherein the controller is programmed to control a rate of carbon dioxide separation in the centrifugal air separator.

A37.3. The centrifugal air separator of any of paragraphs A37-A37.2, wherein the controller is programmed to maintain a level of carbon dioxide in the atmosphere of the enclosure at a partial pressure of less than 1 kPa, less than 0.8 kPa, less than 0.6 kPa, less than 0.4 kPa, less than 0.3 kPa, about 0.5 kPa, about 0.3 kPa, and/or about 0.2 kPa.

A37.4. The centrifugal air separator of any of paragraphs A37-A37.3, wherein the controller is programmed to perform the method of any of paragraphs B1-B6.

A38. A life support system to support mammals living in an enclosure, the life support system comprising:

the centrifugal air separator of any of paragraphs A1-A37.4.

B1. A method of recirculating clean air in an atmosphere of an enclosure, the method comprising:

directing an input air stream from the atmosphere of the enclosure through a coiled duct at a rate sufficient to stratify the input air stream within the coiled duct according to a molecular weight of components of the input air stream and to form a heavy fraction stream and a light fraction stream, wherein the heavy fraction stream is relatively enriched in carbon dioxide as compared to the light fraction stream;

withdrawing the heavy fraction stream from the coiled duct; and returning the light fraction stream from the coiled duct to the atmosphere of the enclosure.

B2. The method of paragraph B1, wherein the directing includes directing the input air stream through the centrifugal air separator of any of paragraphs A1-A37.3.

B3. The method of any of paragraphs B1-B2, further comprising sensing at least one of a concentration and a partial pressure of carbon dioxide in at least one of the atmosphere of the enclosure, the input air stream, the heavy fraction stream, and the light fraction stream.

B4. The method of any of paragraphs B1-B3, further comprising determining a quantity related to a rate of production of carbon dioxide within the enclosure and controlling a level of carbon dioxide in the atmosphere of the enclosure by directing the input air stream through a number of coiled ducts based at least in part upon the quantity, and optionally selecting the number of coiled ducts based at least in part upon the quantity, wherein the level is at least one of a concentration, a partial pressure, and an amount.

B4.1. The method of paragraph B4, wherein the quantity is selected from the group consisting of a number of people within the enclosure, a level of carbon dioxide in the atmosphere of the enclosure, a level of carbon dioxide in the input air stream, a level of carbon dioxide in the heavy fraction stream, a level of carbon dioxide in the light fraction stream, and the rate of production of carbon dioxide within the enclosure.

B4.2. The method of any of paragraphs B4-B4.1, wherein the controlling includes maintaining a partial pressure of carbon dioxide in the atmosphere of the enclosure at a partial pressure of less than 1 kPa, less than 0.8 kPa, less than 0.6 kPa, less than 0.4 kPa, less than 0.3 kPa, about 0.5 kPa, about 0.3 kPa, and/or about 0.2 kPa.

B5. The method of any of paragraphs B1-B4.2, further comprising accumulating the heavy fraction stream.

B6. The method of any of paragraphs B1-B5, further comprising directing the heavy fraction stream out of the enclosure.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function. Further, as used herein, the singular forms "a", "an" and "the" may be intended to include the plural forms as well, unless the context clearly indicates otherwise.

The various disclosed elements of systems and steps of methods disclosed herein are not required of all systems and methods according to the present disclosure, and the present disclosure includes all novel and non-obvious combinations and subcombinations of the various elements and steps disclosed herein. Moreover, any of the various elements and steps, or any combination of the various elements and/or steps, disclosed herein may define independent inventive subject matter that is separate and apart from the whole of a disclosed apparatus or method. Accordingly, such inventive subject matter is not required to be associated with the specific systems and methods that are expressly disclosed herein, and such inventive subject matter may find utility in systems and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, the phrases "at least one of" and "one or more of," in reference to a list of more than one entity, means any one or more of the entities in the list of entities, and is not limited to at least one of each and every entity specifically listed within the list of entities. For example, "at least one of A and B" (or, equivalently, "at least one of A or B," or, equivalently, "at least one of A and/or B") may refer to A alone, B alone, or the combination of A and B.

The invention claimed is:

1. A centrifugal air separator comprising:
a separation section including a plurality of coiled ducts, wherein the separation section has an entrance port, an exit port, and a waste port, wherein each coiled duct has a duct entrance port fluidically connected to the entrance port, a duct exit port fluidically connected to the exit port, a channel defined between the duct entrance port and the duct exit port, and one or more duct waste ports, wherein all duct waste ports of each coiled duct are proximate the duct exit port and fluidically connected to the channel and the waste port; and
a drive section, wherein the drive section is configured to direct an input air stream from an atmosphere of an enclosure into the entrance port and through the separation section;
wherein the separation section is configured to separate the input air stream into a clean air stream emitted from the exit port and a waste stream emitted from the waste port;
wherein the separation section is configured to transmit through the duct entrance port of at least one of the plurality of coiled ducts a duct input air stream that is a portion of the input air stream and is configured to at least partially separate the duct input air stream according to a molecular weight of gaseous components of the duct input air stream into a duct clean air stream that is a portion of the clean air stream and a duct waste stream that is a portion of the waste stream.

2. The centrifugal air separator of claim 1, wherein the waste stream is relatively enriched in carbon dioxide as compared to the clean air stream.

3. The centrifugal air separator of claim 1, wherein the one or more duct waste ports of each coiled duct are within a leading edge region of the respective coiled duct proximate the duct exit port of the respective coiled duct.

4. The centrifugal air separator of claim 1, wherein each coiled duct has a series of loops, wherein an average diameter of the series of loops of each coiled duct is at least 1 and at most 5 times an average diameter of the channel of the respective coiled duct.

5. The centrifugal air separator of claim 1, wherein the channel of each coiled duct has an average diameter of at least 0.1 cm and at most 10 cm.

6. The centrifugal air separator of claim 1, wherein each coiled duct is configured to produce a pressure differential between the duct entrance port and the duct exit port of less than 30 kPa when the duct input air stream is flowing with a mass flow rate of 2.5 g/s.

7. The centrifugal air separator of claim 1, wherein the separation section is configured to emit the clean air stream and the waste stream at a mass flow ratio of the clean air stream to the waste stream of at least 100:1.

8. The centrifugal air separator of claim 1, further comprising a waste collection body that fluidically connects the waste port to the one or more duct waste ports of each of the coiled ducts.

9. The centrifugal air separator of claim 1, further comprising a vacuum source coupled to the waste port.

10. A life support system for an enclosure, the life support system comprising:
a carbon dioxide sensor configured to sense a partial pressure of carbon dioxide in an atmosphere of the enclosure;
a centrifugal air separator including:
a separation section including a coiled duct, wherein the separation section has an entrance port, an exit port, and a waste port, wherein the coiled duct has a duct entrance port fluidically connected to the entrance port, a duct exit port fluidically connected to the exit port, a channel defined between the duct entrance port and the duct exit port, and one or more duct waste ports, wherein all duct waste ports of each coiled duct are proximate the duct exit port and fluidically connected to the channel and the waste port; and
a drive section, wherein the drive section is configured to direct an input air stream from the atmosphere of the enclosure into the entrance port and through the separation section;
wherein the separation section is configured to separate the input air stream into a clean air stream emitted from the exit port and a waste stream emitted from the waste port; and
wherein the separation section is configured to transmit through the duct entrance port a duct input air stream that is a portion of the input air stream, wherein the coiled duct is configured to at least partially separate the duct input air stream according to a molecular weight of gaseous components of the duct input air stream into a duct clean air stream that is a portion of the clean air stream and a duct waste stream that is a portion of the waste stream; and
a controller programmed to maintain a level of carbon dioxide in the atmosphere of the enclosure at a partial pressure of less than a threshold value by controlling air flow through the centrifugal air separator based upon the level of carbon dioxide in the atmosphere of the enclosure.

11. The life support system of claim 10, wherein the centrifugal air separator is configured to flow the input air stream with a mass flow rate of at least 0.5 g/s.

12. The life support system of claim 10, wherein the one or more duct waste ports are within a leading edge region of the coiled duct proximate the duct exit port.

13. The life support system of claim 10, wherein the coiled duct has a series of loops, wherein an average diameter of the series of loops is at least 1 and at most 5 times an average diameter of the channel of the coiled duct.

14. A method of recirculating clean air in an atmosphere of an enclosure, the method comprising:
   directing an input air stream from the atmosphere of the enclosure through a centrifugal air separator that includes a number of coiled ducts at a rate sufficient to stratify the input air stream within each coiled duct according to a molecular weight of gaseous components of the input air stream and to form a heavy fraction stream and a light fraction stream, wherein the heavy fraction stream is relatively enriched in carbon dioxide as compared to the light fraction stream;
   withdrawing the heavy fraction stream from the number of coiled ducts;
   returning the light fraction stream from the number of coiled ducts to the atmosphere of the enclosure; and
   controlling a level of carbon dioxide in the atmosphere of the enclosure by selecting the number of coiled ducts;
   wherein the centrifugal air separator includes:
      a separation section including a plurality of coiled ducts that includes the number of coiled ducts, wherein the separation section has an entrance port, an exit port, and a waste port, wherein each coiled duct has a duct entrance port fluidically connected to the entrance port, a duct exit port fluidically connected to the exit port, a channel defined between the duct entrance port and the duct exit port, and one or more duct waste ports, wherein all duct waste ports of each coiled duct are proximate the duct exit port and fluidically connected to the channel and the waste port; and
      a drive section, wherein the drive section is configured to direct an input air stream from an atmosphere of an enclosure into the entrance port and through the separation section;
   wherein the separation section is configured to separate the input air stream into a clean air stream emitted from the exit port and a waste stream emitted from the waste port; and
   wherein the separation section is configured to transmit through the duct entrance port of at least one of the plurality of coiled ducts a duct input air stream that is a portion of the input air stream and is configured to at least partially separate the duct input air stream according to a molecular weight of gaseous components of the duct input air stream into a duct clean air stream that is a portion of the clean air stream and a duct waste stream that is a portion of the waste stream.

15. The method of claim 14, further comprising determining a quantity selected from the group consisting of a number of people within the enclosure, a level of carbon dioxide in the atmosphere of the enclosure, a level of carbon dioxide in the input air stream, a level of carbon dioxide in the heavy fraction stream, a level of carbon dioxide in the light fraction stream, and a rate of production of carbon dioxide within the enclosure, and wherein controlling includes selecting the number of coiled ducts based upon the quantity.

16. The method of claim 14, further comprising accumulating the heavy fraction stream.

17. The method of claim 14, wherein controlling includes maintaining a partial pressure of carbon dioxide in the atmosphere of the enclosure below 1 kPa.

18. The method of claim 14, wherein directing includes flowing the input air stream at a velocity of at least 10 m/s through each of the coiled ducts.

19. The method of claim 14, wherein directing includes flowing the input air stream at a mass flow rate of at least 0.1 g/s through each of the coiled ducts.

20. The method of claim 14, wherein directing includes flowing the input air stream through each of the coiled ducts in a generally laminar manner.

* * * * *